US012595069B2

(12) United States Patent
Venugopal et al.

(10) Patent No.: US 12,595,069 B2
(45) Date of Patent: Apr. 7, 2026

(54) LOCK MECHANISM FOR TELESCOPIC HOLD OPEN ROD

(71) Applicant: Rohr, Inc., Chula Vista, CA (US)

(72) Inventors: Sanjay Venugopal, Hassan (IN); Divya Prakash, Bangalore (IN); Amit Kumar Tripathi, Banbury (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 99 days.

(21) Appl. No.: 18/738,497

(22) Filed: Jun. 10, 2024

(65) Prior Publication Data

US 2024/0409227 A1      Dec. 12, 2024

(30) Foreign Application Priority Data

Jun. 9, 2023      (IN) .............................. 202311039684

(51) Int. Cl.
B64D 29/06          (2006.01)
E05C 17/02          (2006.01)

(52) U.S. Cl.
CPC .............. B64D 29/06 (2013.01); E05C 17/02 (2013.01)

(58) Field of Classification Search
CPC ......... B64D 29/06; E05C 17/02; E05C 17/30; E05C 17/00; F15B 15/261; F16B 7/105; F16B 7/10; F16F 9/56; Y10T 292/65; Y10T 292/14; Y10T 292/28; Y10T 403/32467; Y10T 403/592; Y10T 403/32426; B64C 1/14
See application file for complete search history.

(56) References Cited

U.S. PATENT DOCUMENTS

| | | | | | |
|---|---|---|---|---|---|
| 2,884,270 | A | * | 4/1959 | Erik ...................... | F16L 37/248 |
| | | | | | 403/DIG. 7 |
| 2,887,991 | A | * | 5/1959 | Driskel ................. | F15B 15/261 |
| | | | | | 92/24 |
| 3,351,363 | A | * | 11/1967 | Downey ................. | A47L 9/244 |
| | | | | | 285/330 |

(Continued)

FOREIGN PATENT DOCUMENTS

| | | | | | |
|---|---|---|---|---|---|
| CA | 2886319 | A1 | * | 4/2014 | .......... F16M 11/041 |
| CN | 104912883 | A | * | 9/2015 | ............... F16B 7/14 |

(Continued)

OTHER PUBLICATIONS

EP Search Report for EP Patent Application No. 24181211.4 dated Dec. 6, 2024.

*Primary Examiner* — Steven A Tullia

(74) *Attorney, Agent, or Firm* — Getz Balich LLC

(57) ABSTRACT

A hold open rod has a control sleeve, an outer cylinder, lock balls, a lock sleeve, a piston, a piston head, a release spring, and a lock spring. The control sleeve has first and second cavity sections, an inner radial surface, a CS channel, and a pin. The outer cylinder has an OC inner cavity, OC inner and outer radial surfaces, an OC axial end wall, lock ball apertures, and a pin guide slot. The lock balls are configured to pass through the lock ball apertures. The piston has first and second sections. The piston head has an outer radial surface, a channel, and a piston bore. The piston bore is configured to receive the first section of the piston. The release spring biases the control sleeve toward a first axial end. The lock spring biases the lock sleeve toward a second axial end.

20 Claims, 9 Drawing Sheets

(56) References Cited

U.S. PATENT DOCUMENTS

| | | | | |
|---|---|---|---|---|
| 4,951,552 A * | 8/1990 | Fox | F15B 15/261 | 92/24 |
| 5,141,355 A * | 8/1992 | Stillwagon | F16B 7/1409 | 403/322.2 |
| 6,007,268 A * | 12/1999 | Whittington | A63B 21/0728 | 403/348 |
| 6,193,223 B1 * | 2/2001 | Jackson | F16F 9/185 | 267/64.12 |
| 6,334,730 B1 | 1/2002 | Porte | | |
| 7,350,628 B2 * | 4/2008 | Adoline | F16F 9/56 | 188/67 |
| 8,123,428 B2 * | 2/2012 | Wareham | F16B 7/105 | 403/348 |
| 9,101,214 B2 * | 8/2015 | Rothschild | F16M 7/00 | |
| 9,464,645 B2 | 10/2016 | Dyer | | |
| 9,580,945 B2 * | 2/2017 | Artin | F16F 9/56 | |
| 10,030,681 B2 * | 7/2018 | Lai | F16B 7/105 | |
| 10,208,771 B2 * | 2/2019 | Lewendon | F15B 15/16 | |
| 10,865,738 B2 * | 12/2020 | Kopecek | F02K 1/763 | |
| 11,028,896 B2 * | 6/2021 | Probst | F16F 9/52 | |
| 11,137,006 B2 * | 10/2021 | Kennedy | F16B 7/105 | |
| 2013/0175419 A1 * | 7/2013 | Wheeler | E05C 17/02 | 248/354.1 |
| 2018/0223572 A1 | 8/2018 | Artin | | |
| 2020/0271072 A1 * | 8/2020 | Kopecek | F02K 1/766 | |

FOREIGN PATENT DOCUMENTS

| | | | | |
|---|---|---|---|---|
| CN | 109505824 A * | 3/2019 | | F15B 15/261 |
| CN | 114110073 A * | 3/2022 | | F16F 9/56 |
| CN | 112431819 B * | 2/2025 | | B64C 25/26 |
| DE | 4107980 A1 | 9/1992 | | |
| DE | 10160030 A1 * | 6/2003 | | A47B 9/00 |
| FR | 2575780 A1 * | 7/1986 | | F16B 7/10 |
| JP | H04114154 U * | 10/1992 | | F16G 11/10 |
| JP | 2532576 Y2 * | 4/1997 | | F16G 11/10 |
| JP | 10184814 A * | 7/1998 | | F16G 11/10 |
| WO | WO-9601064 A1 * | 1/1996 | | F16B 7/105 |

* cited by examiner

LOCK MECHANISM FOR TELESCOPIC HOLD OPEN ROD

This application claims priority to Indian Patent Appln. No. 202311039684 filed Jun. 9, 2023 which is hereby incorporated herein by reference in its entirety.

BACKGROUND OF THE INVENTION

1. Technical Field

The present disclosure relates to hold open rods in general and to self lock mechanisms for telescoping hold open rods in particular.

2. Background Information

A nacelle often includes a pair of fan cowls, with one of the fan cowls disposed on a first side of the engine (e.g., the "inner fan cowl") and the other fan cowl disposed on a second side of the engine opposite the first side (e.g., the "outer fan cowl"). The top end of the fan cowls are typically hinged to the pylon or to a frame structure at the top of the nacelle and the bottom end of the fan cowls may be joined together with one or more latch mechanisms. Each fan cowl may be pivoted outwardly to provide access to engine and nacelles components; e.g., for inspection and/or maintenance of components enclosed within the fan cowl.

Hold open rods (HORs) may be used to hold a fan cowl in an open position. In some applications, a fan cowl HOR may support a considerable amount of weight. It is important that a HOR not only be able to support the fan cowl weight, but also be configured for safe operation. For example, a fan cowl HOR is preferably configured to lock in a deployed configuration when the fan cowl is open, and is configured to prevent inadvertent closing.

SUMMARY

According to an aspect of the present disclosure, a telescopic hold open rod having an axial centerline that extends between a first axial end and a second axial end is provided. The hold open rod includes a control sleeve, an outer cylinder, a plurality of lock balls, a lock sleeve, a piston, a piston head, a release spring, and a lock spring. The control sleeve has a first CS cavity section defined by a first CS inner radial surface, a second CS cavity section defined by a second CS inner radial surface, a CS channel disposed in the second CS inner radial surface, and a pin extending radially inward from the second CS inner radial surface. The outer cylinder has an OC inner cavity, an OC inner radial surface, an OC outer radial surface, an OC axial end wall, a plurality lock ball apertures extending between the OC inner radial surface and the OC outer radial surface, and a pin guide slot configured to receive the pin. The outer cylinder extends axially within the first CS cavity section and the second CS cavity section. The lock balls are each configured to pass through a respective lock ball aperture. The lock sleeve has an LS bore. A portion of the lock sleeve is disposed in the OC inner cavity. The piston has first and second sections, and a piston shoulder surface that extends radially between the first and second sections. The first and second sections extend axially within the OC inner cavity. The second section extends axially within the LS bore. The piston head has a PH outer radial surface, a first PH channel disposed in the PH outer radial surface, and a piston bore. The first PH channel extends around a circumference of the PH outer radial surface. The piston bore is configured to receive the first section of the piston. The piston head is disposed within OC inner cavity. The release spring is disposed between the OC outer radial surface and the first CS inner radial surface and is configured to bias the control sleeve toward the first axial end. The lock spring is disposed between the OC outer radial surface and the lock spring and is configured to bias the lock sleeve toward the second axial end.

In any of the aspects or embodiments described above and herein, the hold open rod may be configurable in unlocked and locked configurations. In the unlocked configuration, each respective lock ball may extend within a respective lock ball aperture and the CS channel and the control sleeve may be locked in position relative to the outer cylinder.

In any of the aspects or embodiments described above and herein, the CS channel may extend around a circumference of the second CS cavity section and may include a base surface disposed between a pair of ramp surfaces.

In any of the aspects or embodiments described above and herein, in a transition from the unlocked configuration to the locked configuration, the control sleeve may be configured to translate axially relative to the outer cylinder in a direction toward the first axial end and one of the ramp surfaces may push each respective lock ball radially inward.

In any of the aspects or embodiments described above and herein, in the locked configuration, each respective lock ball may extend within a respective lock ball aperture and the first PH channel and the piston head may be locked in position relative to the control sleeve.

In any of the aspects or embodiments described above and herein, the first PH channel may extend around a circumference of the piston head and may include a base surface disposed between a pair of ramp surfaces.

In any of the aspects or embodiments described above and herein, in a transition from the locked configuration to the unlocked configuration, the piston head may be configured to translate axially relative to the outer cylinder in a direction toward the second axial end and one of the ramp surfaces may push each respective lock ball radially outward.

In any of the aspects or embodiments described above and herein, the piston head may include a bearing disposed in a second PH channel disposed in the PH outer radial surface.

In any of the aspects or embodiments described above and herein, the pin guide slot may be configured such that a transition from the locked configuration to the unlocked configuration requires the control sleeve to be translated both axially and rotationally relative to the outer cylinder.

In any of the aspects or embodiments described above and herein, the pin guide slot may have a first axial end, a second axial end, an axially extending guide portion, and a ramp portion. The ramp portion may extend from the first axial end to the axially extending guide portion and the axially extending guide portion may extend from the second axial to the ramp portion. The ramp portion may be defined by a guide ramp surface, a side surface, and a base surface that collectively form a generally triangular aperture in the outer cylinder.

In any of the aspects or embodiments described above and herein, the piston may include a piston head retainer that is configured to engage with the piston head in a manner that causes the piston to axially move the piston head in a first direction toward the first axial end, and to disengage with the piston head when the piston is axially moved in a second direction opposite the first direction.

In any of the aspects or embodiments described above and herein, the lock sleeve may have a first LS shoulder surface that extends radially between a first LS outer radial surface and a second LS outer radial surface, and a second LS shoulder surface that extends radially between the second LS outer radial surface and a third LS outer radial surface. The first LS outer radial surface and the second LS outer radial surface may be disposed in the OC inner cavity.

In any of the aspects or embodiments described above and herein, the lock spring may be axially disposed between the OC axial end wall and the first LS shoulder surface.

In any of the aspects or embodiments described above and herein, the hold open rod may be configurable in an unlocked configuration and a locked configuration, and in the locked configuration, the second LS shoulder surface may be disposed contiguous with the OC axial end wall.

In any of the aspects or embodiments described above and herein, the lock sleeve may include a lock sleeve retainer that is configured to engage with the OC axial end wall when the hold open rod is disposed in the unlocked configuration, and the lock sleeve retainer may be disengaged with the OC axial end wall when the hold open rod is disposed in the locked configuration.

In any of the aspects or embodiments described above and herein, the hold open rod may be configurable in a locked and loaded configuration, and in the locked and loaded configuration, the piston shoulder surface may be disposed in contact with a first axial end of the piston head.

In any of the aspects or embodiments described above and herein, the outer cylinder may include a release spring flange extending radially outward from the OC outer radial surface, and the control sleeve may include a CS shoulder surface extending between the first CS inner radial surface and the second CS inner radial surface, and the release spring may be axially disposed between the release spring flange and the CS shoulder surface.

In any of the aspects or embodiments described above and herein, the hold open rod may be configurable in an unlocked configuration and a locked configuration. The outer cylinder may include an OC retainer engaged with the OC outer radial surface and the control sleeve may include an OC retainer bore disposed at a first axial end of the control sleeve. In the locked configuration, the OC retainer may be engaged with the OC retainer bore, and in the unlocked configuration the OC retainer may be disengaged with the OC retainer bore.

In any of the aspects or embodiments described above and herein, the hold open rod may be configurable in an unlocked configuration and a locked configuration. In the unlocked configuration, each respective lock ball may extend within a respective lock ball aperture and the CS channel and the control sleeve may be locked in position relative to the outer cylinder. In the locked configuration, each respective lock ball may extend within a respective lock ball aperture and the first PH channel and the piston head may be locked in position relative to the outer cylinder.

In any of the aspects or embodiments described above and herein, in a first transition from the unlocked configuration to the locked configuration, the piston head may be configured to translate axially relative to the outer cylinder until the first PH channel is aligned with the lock ball apertures, and the control sleeve may be configured to translate axially and rotationally relative to the outer cylinder, and each respective lock ball may be moved radially inward to extend within the respective lock ball aperture and the first PH channel. In a second transition from the locked configuration to the unlocked configuration, the control sleeve may be configured to translate rotationally and axially relative to the outer cylinder, the axial translation in a direction toward the second axial end, until the CS channel is aligned with the lock ball apertures, and the piston head may be configured to translate axially relative to the outer cylinder in a direction toward the second axial end, and each respective lock ball is moved radially outward to extend within the respective lock ball aperture and the CS channel.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 3 illustrates the fan cowl member disposed in a stowed condition. FIG. 3B illustrates the fan cowl member disposed in a maximum open condition.

DETAILED DESCRIPTION

Figure 1:
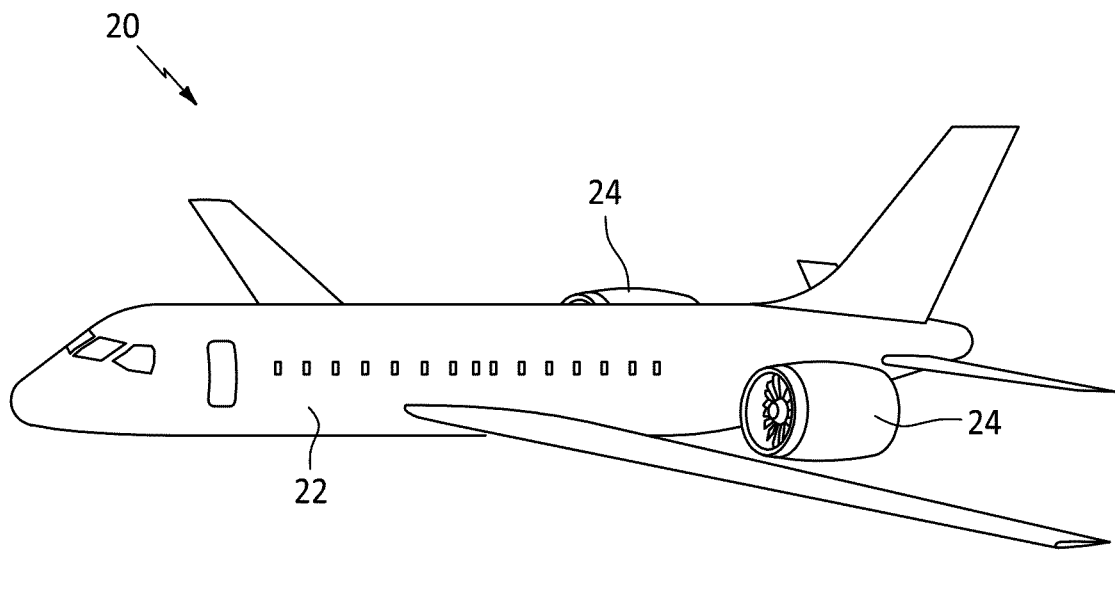
FIG. 1 is a perspective view of an aircraft in accordance with various embodiments of the present disclosure.

Aspects of the present disclosure include telescopic hold open rods (HORs) that may be used in an aircraft fan cowl, an aircraft fan cowl that utilizes the present disclosure HOR, and an aircraft that utilizes the present disclosure system. FIG. 1 illustrates a conventional fixed wing aircraft 20 that may utilize embodiments of the present disclosure HOR. The aircraft includes a fuselage 22 and at least one nacelle 24.

Figure 2:
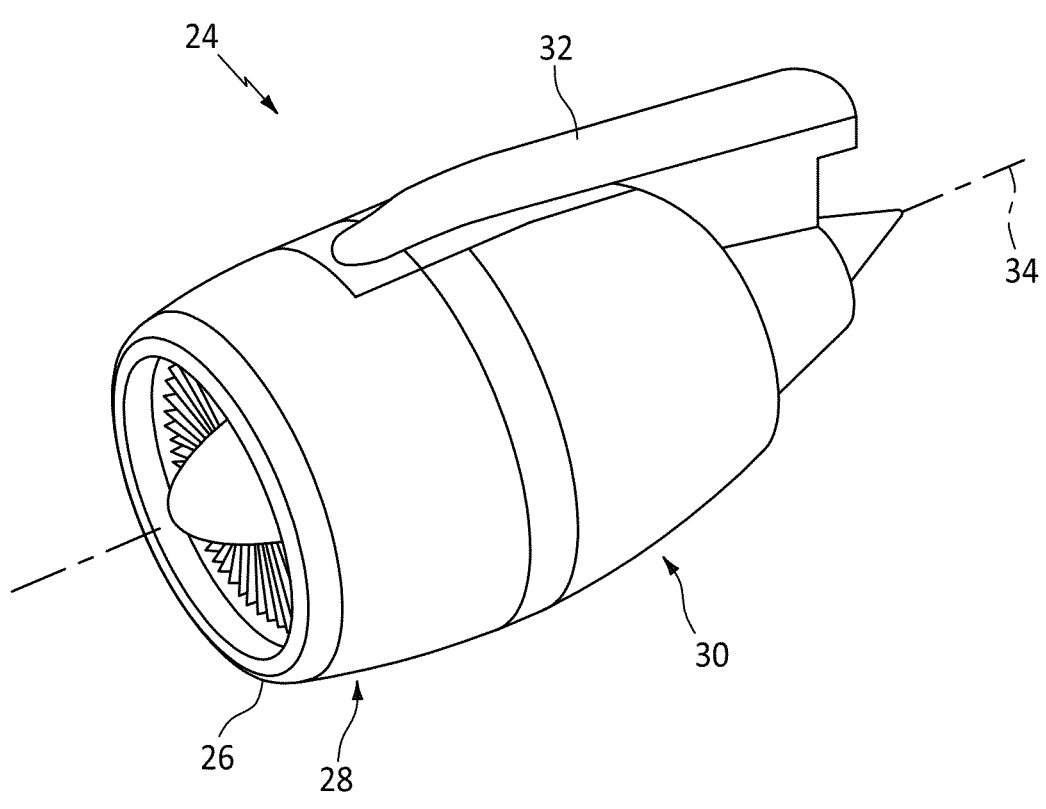
FIG. 2 is a diagrammatic illustration of an aircraft nacelle that may include embodiments of the present disclosure.

Referring to FIG. 2, a nonlimiting example of a nacelle 24 for an aircraft engine (e.g., a gas turbine engine) is shown. The nacelle 24 includes an inlet 26, a fan cowl 28, and a thrust reverser 30. The nacelle 24 may be attached to a pylon 32 that mounts the nacelle 24 to an aircraft wing or aircraft body. The nacelle 24 surrounds the engine providing smooth aerodynamic surfaces for airflow around and into the engine. The fan cowl 28 may include a first fan cowl member (e.g., an inner fan cowl) and a second fan cowl member (e.g., an outer fan cowl). The first and second fan cowl members may be pivotally attached (e.g., hinged) to the pylon 32 or to a frame structure attached at the gravitational top of nacelle 24. The nacelle 24 is disposed about an axial centerline 34 that typically coincides with the axis of rotation of an engine housed within the nacelle 24. Each of the first and second fan cowl members may be pivoted between open positions (provides access into the interior of the nacelle; e.g., access to the oil tank, full authority digital engine control (FADEC), and other components) and a closed position where no interior access is permitted and the first and second fan cowl members are positioned as part of the aerodynamic shape of the nacelle exterior. One or more latch assemblies (not shown) may be used to secure the first and second fan cowl members in the closed position and provide the mechanism for selectively releasing the first and second fan cowl members from the closed position so they may be rotated into the open positions.

Figures 3, 3A, 3B:
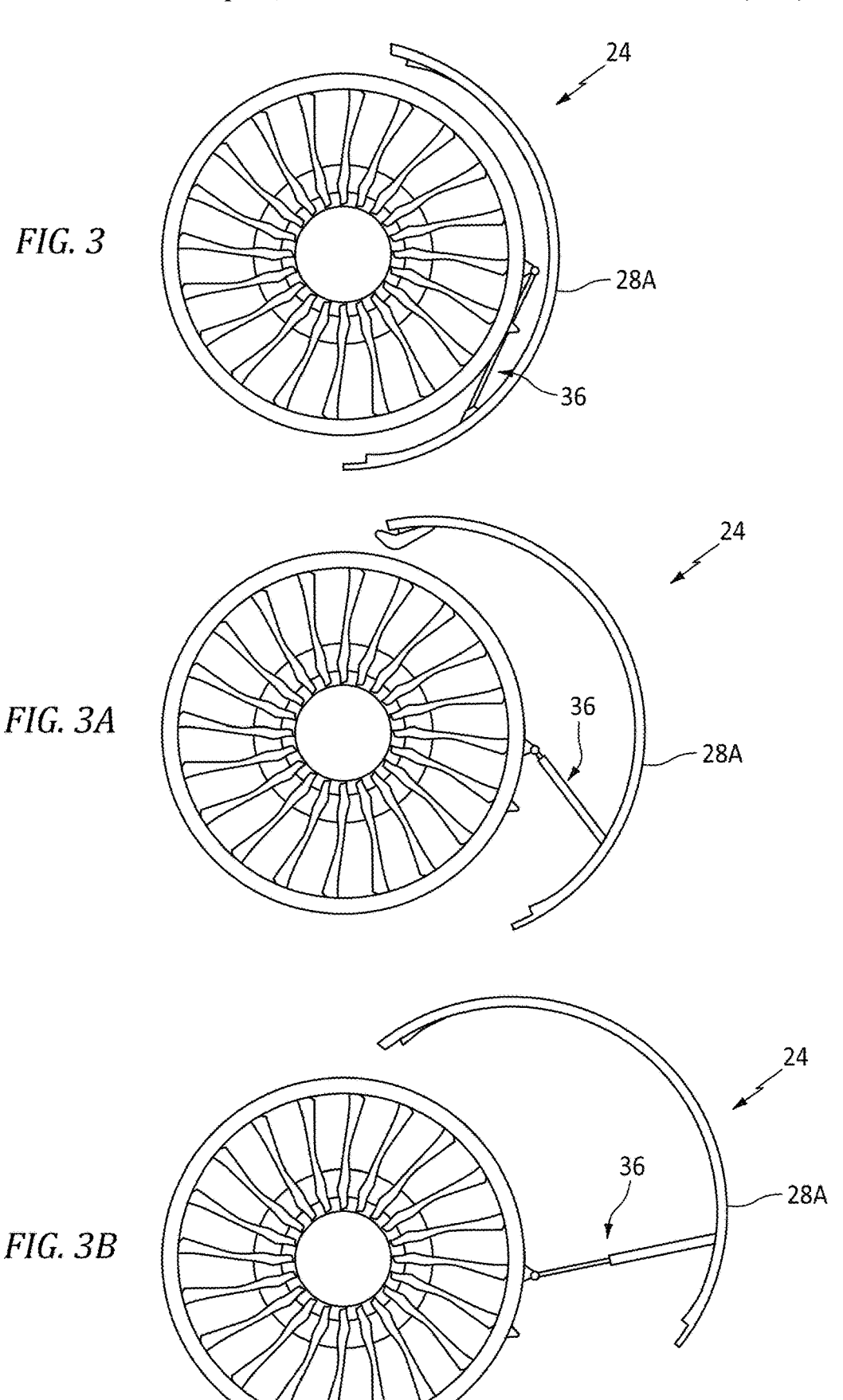
FIGS. 3-3B are diagrammatic representations of a nacelle having a fan cowl member supported by a hold open rod (HOR) configuration.
FIG. 3A illustrates the fan cowl member disposed in a partially open condition.

Referring to FIGS. 3-3B, a portion of a nacelle 24 is diagrammatically shown. FIG. 3 illustrates a fan cowl member 28A disposed in a stowed condition with a HOR 36 pivotally connected at one end (i.e., the "nacelle end") to a fixed member of the nacelle 24 and pivotally connected at the opposite end (i.e., the "cowl end") to the fan cowl member 28A. FIG. 3A illustrates the fan cowl member 28A disposed in a partially open condition with the HOR 36 rotated from its stowed position. FIG. 3B illustrates the fan cowl member 28A disposed in a maximum open condition with the HOR 36 rotated from its stowed position and in an extended and locked condition.

Figure 4:
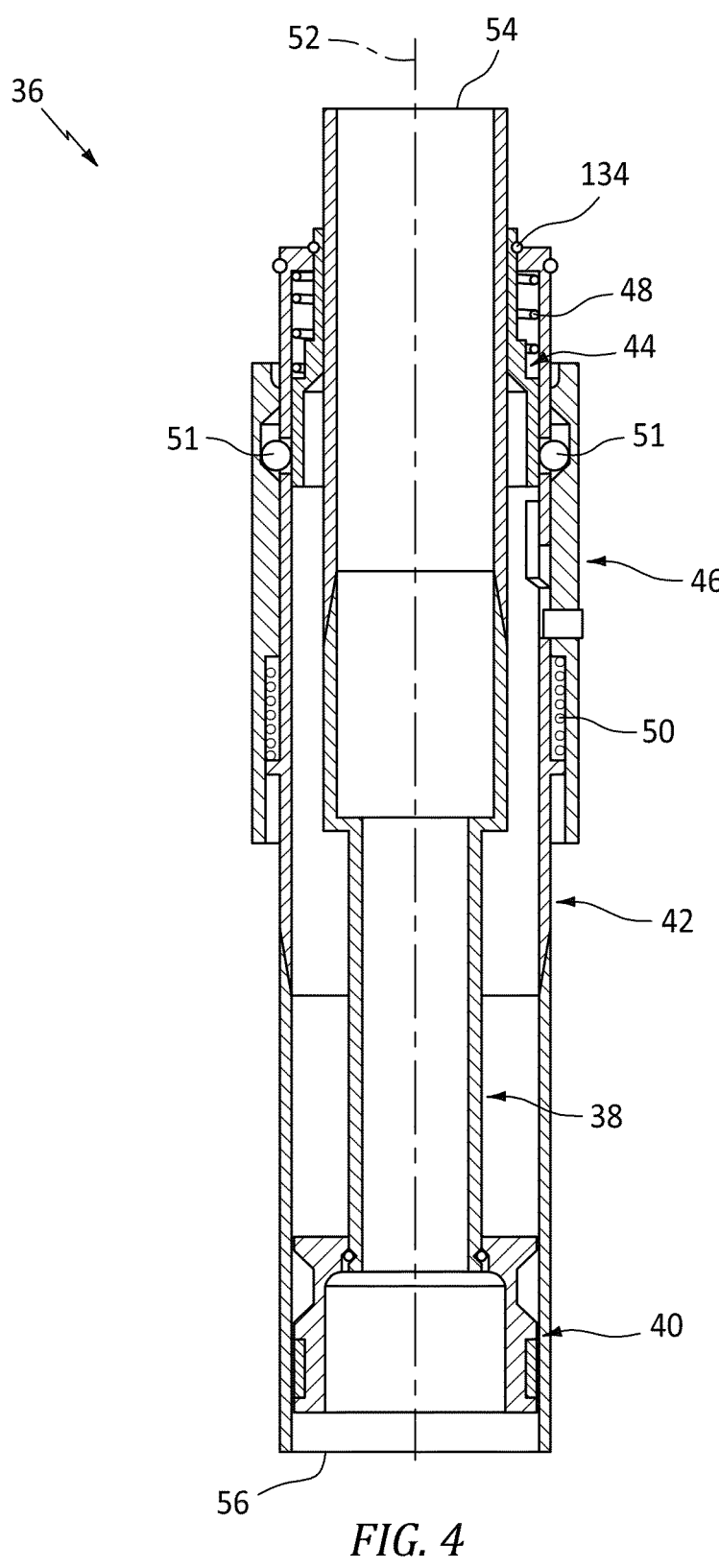
FIG. 4 diagrammatically illustrates a present disclosure telescopic HOR embodiment.

Referring to FIG. 4, the present disclosure telescopic HOR 36 includes a piston 38, a piston head 40, an outer cylinder 42, a lock sleeve 44, a control sleeve 46, a lock spring 48, a release spring 50, and a plurality of lock balls 51. The HOR 36 extends lengthwise along an axial centerline 52 between a first axial end 54 (i.e., the "cowl end") and an opposite second axial end 56 (i.e., the "nacelle end").

Figure 5:
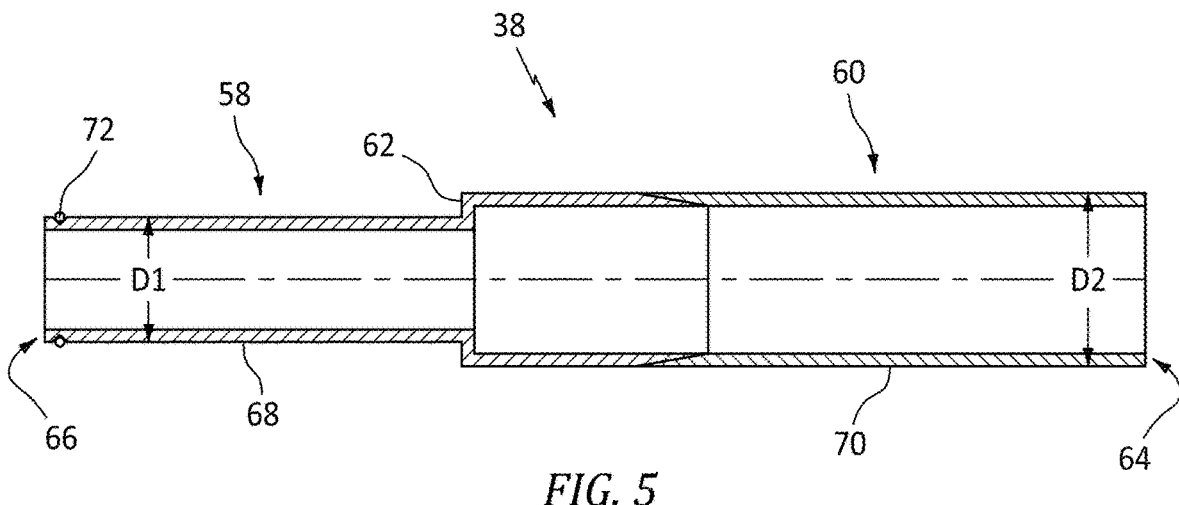
FIG. 5 diagrammatically illustrates a piston component of a present disclosure HOR embodiment.

Referring to FIGS. 4 and 5, the piston 38 includes a first section (PFS) 58, a second section (PSS) 60, a piston shoulder surface 62, a first axial end 64, and a second axial end 66. The first section 58 has a PFS outer radial surface 68 disposed at a first outer diameter (D1) and a second section 60 (PSS) having a PSS outer radial surface 70 disposed at a second outer diameter (D2). The second outer diameter is greater than the first outer diameter (D2>D1), and the piston shoulder surface 62 extends radially between the PFS outer radial surface 68 and the PSS outer radial surface 70. The piston first section 58 extends lengthwise between the piston second section 60 and the second axial end 66. The piston second section 60 extends lengthwise between the piston first section 58 and the first axial end 64. The piston first section 58 is configured to engage the piston head 40 in a manner that causes the piston head 40 to travel with the piston 38 during movement of the piston 38 in a first axial direction (i.e., during HOR 36 expansion), and will permit relative movement between the piston first section 58 and the piston head 40 in a second axial direction, opposite the first axial direction (i.e., during HOR 36 contraction). In the embodiment shown in FIGS. 4 and 5, the piston first section 58 includes a piston head retainer 72 partially disposed within the PFS outer radial surface 68 configured for engagement with the piston head 40 as will be described in further detail herein. The present disclosure is not limited to using any particular retainer 72 configuration (e.g., a ring) for engagement between the piston first section 58 and the piston head 40. The piston 38 may comprise a metal or a composite material such as carbon fiber reinforced plastic (CFRP). The present disclosure is not, however, limited to these material examples.

Figure 6:
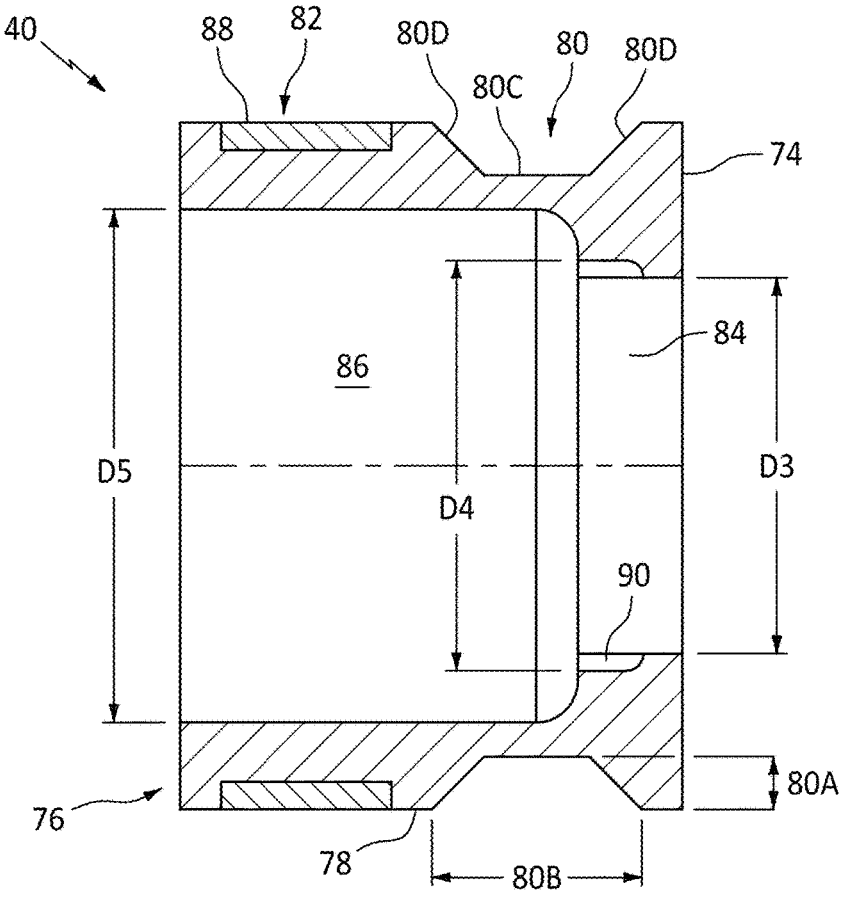
FIG. 6 diagrammatically illustrates a piston head component of a present disclosure HOR embodiment.

Referring to FIGS. 4 and 6, the piston head 40 (PH) includes a first axial end 74, a second axial end 76, a PH outer radial surface 78, a first PH channel 80 disposed in the PH outer radial surface 78, a second PH channel 82 disposed in the PH outer radial surface 78, a piston bore 84, and a secondary bore 86. The first and second PH channels 80, 82 extend around the circumference of the piston head 40. The second PH channel 82 is configured to receive a bearing 88. A non-limiting example of a bearing 88 that may be used is a sleeve bearing comprising a material such as polyether ether ketone (PEEK). The present disclosure is not limited to a sleeve bearing or a sleeve bearing comprising PEEK. The first PH channel 80 has a depth 80A, a width 80B, and a base surface 80C disposed between a pair of ramp surfaces 80D.

The first PH channel 80 is configured to receive at least a portion of a spherical lock ball 51 as will be detailed further herein. The piston bore 84 extends from the first axial end 74 to the secondary bore 86, and the secondary bore 86 extends from the second axial end 76 to the piston bore 84. The piston bore 84 has an inner diameter (D3) sized to provide a slide fit with the PFS outer radial surface 68. As stated above, the piston first section 58 is configured to engage the piston head 40 and may include a piston head retainer 72. In this embodiment, the piston head 40 includes a retainer bore 90 having an inner diameter (D4) extending axially from the secondary bore 86. The retainer bore 90 is sized to receive a portion of the PH retainer 72 extending radially outward from the PFS outer radial surface 68. The retainer bore 90 inner diameter is greater than the piston bore 84 inner diameter (D4>D3). The secondary bore 86 has an inner diameter (D5) and the secondary bore inner diameter is greater than the retainer bore 90 inner diameter and the piston bore 84 inner diameter (D5>D4>D3). The piston head 40 may comprise a material such as aluminum or stainless steel. The present disclosure is not, however, limited to these material examples.

Referring to FIGS. 4 and 7-9, the outer cylinder 42 (OC) includes an OC inner cavity 92, an OC inner radial surface 94, an OC outer radial surface 96, an OC first axial end 98, an OC second axial end 100, an OC first axial end wall 102, a release spring flange 104, a plurality lock ball apertures 106, and a pin guide slot 108. The OC inner cavity 92 is defined by the OC inner radial surface 94. The OC outer radial surface 96 is opposite the OC inner radial surface 94. The OC first axial end wall 102 is disposed at the first axial end 98 and includes an OC first axial end wall bore 110 configured to receive a portion of the lock sleeve 44. In some embodiments, the outer cylinder 42 may include a circumferentially extending LS retainer bore 112 disposed inwardly at the edge of the OC first axial end wall bore 110. The LS retainer bore 112 is configured to receive a lock sleeve retainer as will be detailed herein. In some embodiments, the outer cylinder 42 may include an OC retainer 114 engaged with the OC outer radial surface 96 proximate the first axial end 98 of the outer cylinder 42. The OC retainer 114 is configured for engagement with the OC retainer bore disposed in the control sleeve 46 as will be described herein. The release spring flange 104 extends outwardly from the OC outer radial surface 96. The lock ball apertures 106 are aligned with one another at an axial position, are disposed around the circumference of the outer cylinder 42, and each is configured to permit a lock ball 51 to travel radially therethrough.

Figure 7:
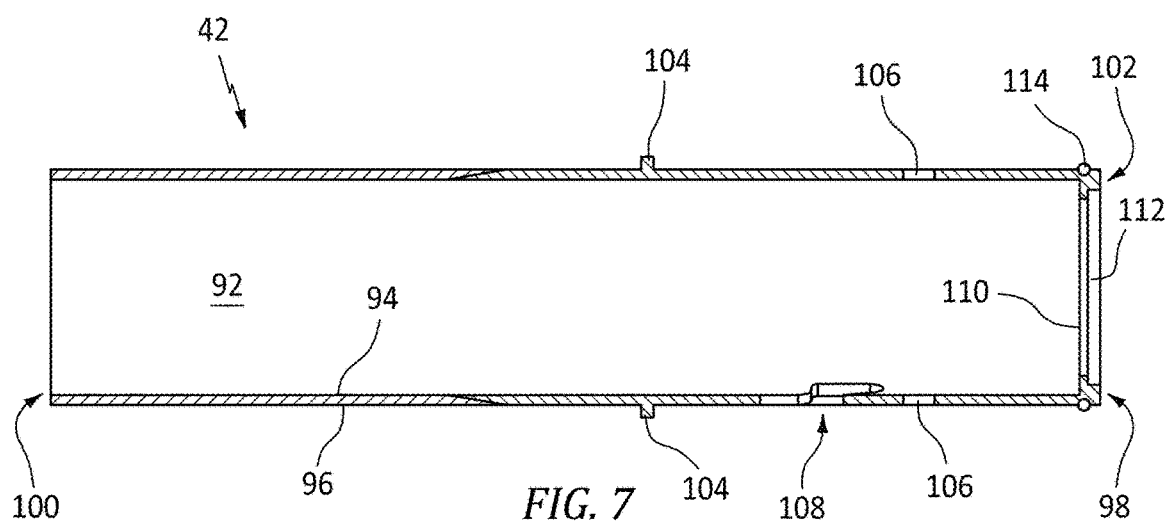
FIG. 7 diagrammatically illustrates an outer cylinder component of a present disclosure HOR embodiment.
Figure 8:
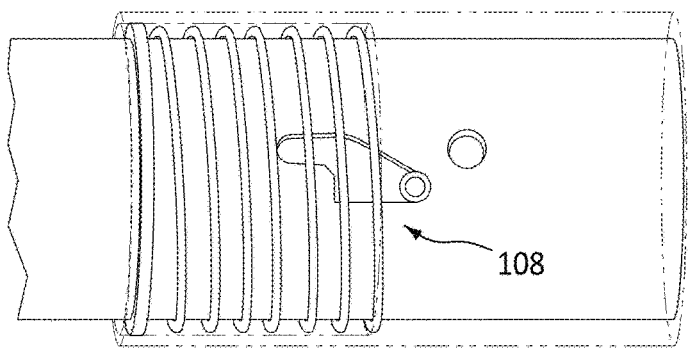
FIG. 8 diagrammatically illustrates a portion of a present disclosure HOR embodiment, enlarged to show a pin slot guide.
Figure 9:
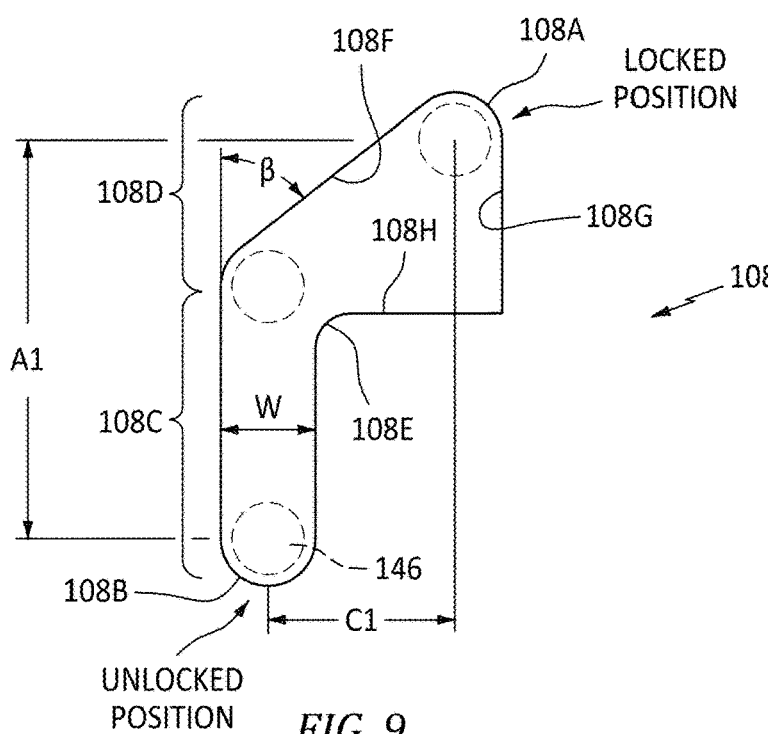
FIG. 9 diagrammatically illustrates a pin slot guide.

Referring to FIGS. 7-9, the pin guide slot 108 is configured to have a first axial end 108A, a second axial end 108B, an axially extending guide portion 108C, a ramp portion 108D, and an intermediate position 108E. The first and second axial ends 108A, 108B are axially separated from one another by a distance "A1". The first and second axial ends 108A, 108B are circumferentially spaced apart from one another by a distance "C1". The intermediate position 108E is disposed at the interface between the axially extending guide portion 108C and the ramp portion 108D. The axially extending guide portion 108C extends from the second axial end 108B to the intermediate position 108E. The axially extending guide portion 108C has a width "W" that is sized to form a slide fit with a pin 146 attached to the control sleeve 46 as will be detailed herein. The ramp portion 108D is defined by a guide ramp surface 108F, a side surface 108G, and a base surface 108H. Collectively, the guide ramp surface 108F, side surface 108G, and base surface 108H form a generally triangular aperture in the outer cylinder 42. The guide ramp surface 108F intersects with the axially extending guide portion 108C at the intermediate position 108E and extends to the first axial end 108A. The guide ramp surface 108F extends both axially and circumferentially and may be described as extending at an angle beta (ß) relative to the axial centerline of the HOR 36. The side surface 108G is disposed opposite the guide ramp surface 108F, and extends from the first axial end 108A to the base surface 108H in a direction that is parallel to the axial centerline of the HOR 36. The base surface 108H, which is disposed proximate to the intermediate position 108E, extends circumferentially from the side surface 108G to the axially extending guide portion 108C. As will be detailed herein, the pin guide slot 108 is configured to require movement in two directions (axial and rotational) to permit the HOR 36 to transition from an unlocked configuration to a locked configuration and vice versa. The above described pin guide slot 108 configuration is an example of a configuration that requires movement in two directions (axial and rotational) to permit the HOR 36 to transition from an unlocked configuration to a locked configuration and vice versa. The present disclosure is not limited to this specific pin guide slot 108 configuration. For example, alternative pin guide slot 108 configurations may be used to satisfy a different unlock sequence.

Figure 10:
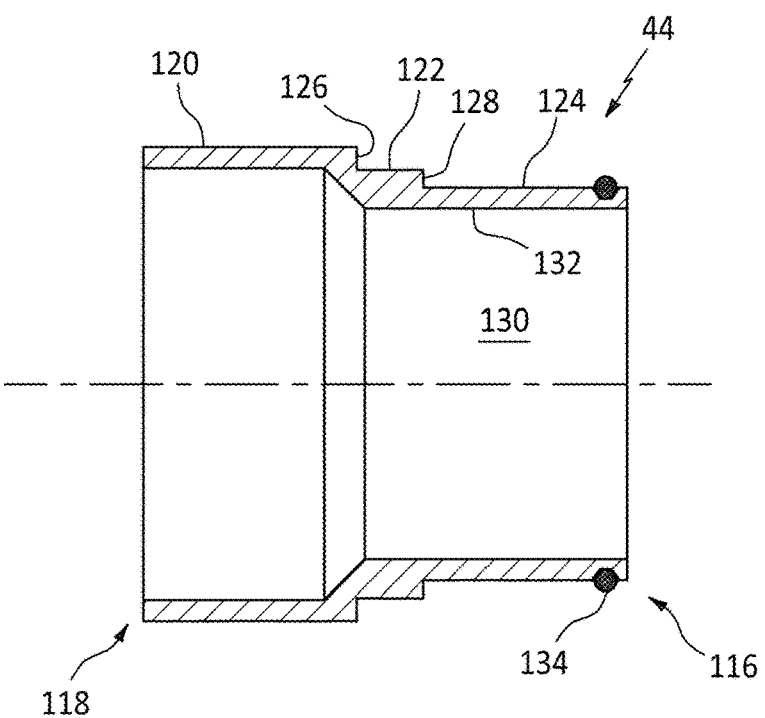
FIG. 10 diagrammatically illustrates a lock sleeve component of a present disclosure HOR embodiment.
Figure 11:
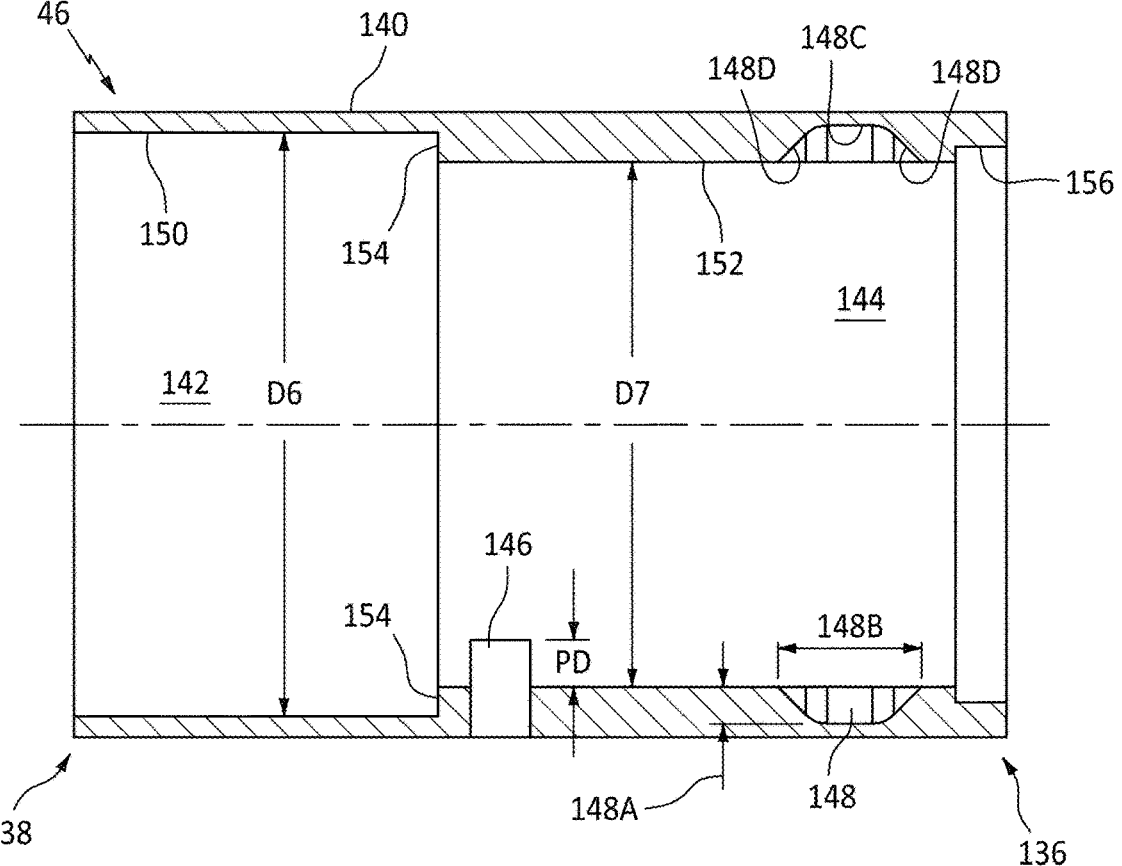
FIG. 11 diagrammatically illustrates a control sleeve component of a present disclosure HOR embodiment.

Referring to FIGS. 4 and 10, the lock sleeve 44 (LS) has a LS first axial end 116, a LS second axial end 118, a first LS outer radial surface 120, a second LS outer radial surface 122, a third LS outer radial surface 124, a first LS shoulder surface 126, a second LS shoulder surface 128, an LS bore 130 defined by an inner LS radial surface 132, and an LS retainer 134. The first LS outer radial surface 120 extends axially from the second axial end 118 to the second LS outer radial surface 122, the second LS outer radial surface 122 extends axially from the first LS outer radial surface 120 to the third LS outer radial surface 124, and the third LS outer radial surface 124 extends axially from the second first LS outer radial surface 122 to the first axial end 116. The first LS shoulder surface 126 extends between the first LS outer radial surface 120 and the second LS outer radial surface 122 and the second LS shoulder surface 128 extends between the second LS outer radial surface 122 and the third LS outer radial surface 124. The first LS outer radial surface 120 is configured to create a slide fit with the OC inner radial surface 94. The third LS outer radial surface 124 is configured to create a slide fit with the OC first axial end wall bore 110. The inner LS radial surface 132 is configured to create a slide fit with the PSS outer radial surface 70. The LS retainer 134 is engaged with the third LS outer radial surface 124 and is disposed to limit the travel of the lock sleeve 44 as will be detailed herein.

The control sleeve 46 (CS) includes a CS first axial end 136, a CS second axial end 138, a CS outer radial surface 140, a first CS cavity section 142, a second CS cavity section 144, a pin 146, and a CS channel 148 that extends circumferentially around the control sleeve 46. The first and second axial ends 136, 138 are opposite one another. The first CS cavity section 142 has a diameter D6 and is defined by a first CS inner radial surface 150. The second CS cavity section 144 has a diameter D7 and is defined by a second CS inner radial surface 152. The first CS cavity section diameter D6 is greater than the second CS cavity section diameter D7 (D6>D7). The first CS cavity section 142 extends from the CS second axial end 138 to the second CS cavity section 144 and the second CS cavity section 144 extends from the first axial end 136 to the first CS cavity section 142. A CS shoulder surface 154 extends radially between the first CS inner radial surface 150 and the second CS inner radial surface 152. The pin 146 extends into the second CS cavity section 144 a distance ("PD") beyond the second CS inner radial surface 152 for engagement with the pin guide slot 108 as will be detailed herein. The CS channel 148 has a depth 148A, a width 148B, and a base surface 148C disposed between a pair of ramp surfaces 148D. In some embodiments, the control sleeve 46 may include a circumferentially extending OC retainer bore 156 disposed at the CS first axial end 136, extending inwardly at the intersection of the second CS inner radial surface 152 and the first axial end 136.

Figure 12:
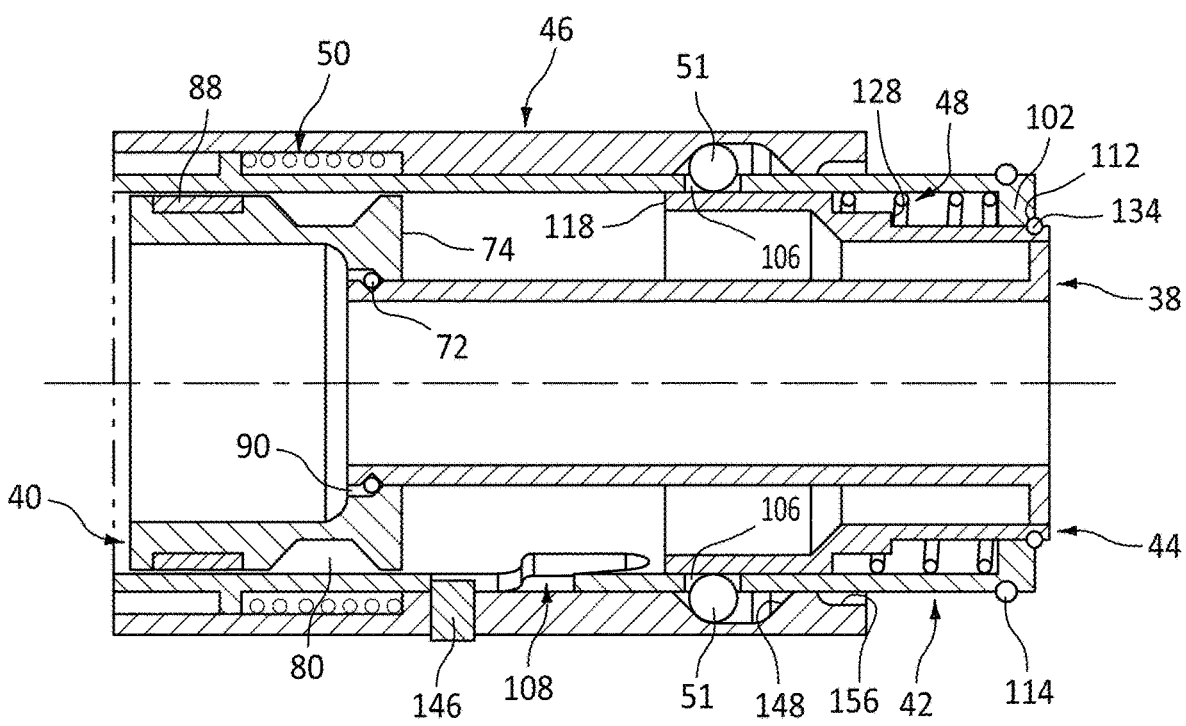
FIG. 12 diagrammatically illustrates a present disclosure HOR embodiment in an unlocked configuration.

Referring to FIGS. 4 and 12, the lock spring 48 is disposed in an annular region between the lock sleeve 44 and the outer cylinder 42. Depending on the configuration of the HOR 36, a portion of the lock spring 48 may be disposed radially between the second LS outer radial surface 122 and the OC inner radial surface 94, and a portion radially between the third LS outer radial surface 124 and the OC inner radial surface 94 (e.g., in a HOR 36 unlocked configuration—see FIGS. 12 and 13), or the entire lock spring 48 may be disposed between the second LS outer radial surface 122 and the OC inner radial surface 94 (e.g., in a HOR 36 locked configuration—see FIG. 14). The lock spring 48 may be disposed axially between the first LS shoulder surface 126 and the inner surface of the OC first axial end wall 102. In the FIGURES, the lock spring 48 is shown as a helical spring and is configured to resist axial movement of the lock sleeve 44 toward the first axial end 54 of the HOR 36 and to bias the lock sleeve 44 in the opposite direction toward the second axial end 56 of the HOR 36. The present disclosure is not limited to any particular lock spring 48 configuration. In FIGS. 4 and 12 wherein the HOR 36 is in an unlocked configuration, the lock spring 48 is in a substantially uncompressed state. In FIG. 15 wherein the HOR 36 is in a locked configuration and in FIG. 16 wherein the HOR 36 is in a locked and loaded configuration, the lock spring 48 is in a compressed state.

The release spring 50 is disposed in an annular region radially between the OC outer radial surface 96 and the first CS inner radial surface 150. The release spring 50 is disposed axially between the CS shoulder surface 154 and the release spring flange 104. In the FIGURES, the release spring 50 is shown as a helical spring and is configured to bias the control sleeve 46 toward the first axial end 54 of the HOR 36 and to resist movement of the control sleeve 46 in the opposite direction. The present disclosure is not limited to any particular release spring 50 configuration. In FIGS. 4 and 12 wherein the HOR 36 is in an unlocked configuration, the release spring 50 is in a compressed state. When the HOR 36 is in a locked configuration, the release spring 50 is in an uncompressed state.

FIGS. 4 and 12 illustrate a present disclosure HOR 36 embodiment disposed in an "unlocked" configuration. FIG. 3 illustrates a fan cowl member 28A disposed in a stowed condition. When the fan cowl member 28A is in a stowed condition, the HOR 36 is in an unlocked configuration. In the unlocked configuration, the piston head 40 is mounted within the OC inner cavity 92 proximate the second axial end 56 of the HOR 36, and the lock sleeve 44 is mounted within the OC inner cavity 92 proximate the first axial end 54 of the HOR 36. In this position, the lock sleeve 44 is prevented from traveling axially toward the second axial end 56 by the LS retainer 134 that is at least partially received within the LS retainer bore 112 (see FIG. 7) disposed in the OC first axial end wall 102. In the unlocked configuration, the control sleeve 46 is prevented from traveling axially by the lock balls 51 disposed partially in the lock ball apertures 106 disposed in the outer cylinder 42 and partially into the CS channel 148. In the HOR 36 embodiment shown in the FIGURES, the CS channel 148 includes an axial width 148B that is greater than the diameter of the lock balls 51; e.g., to facilitate alignment. In the unlocked configuration, the lock spring 48 is substantially uncompressed and the release spring 50 is compressed. Referring to FIG. 9, in the unlocked configuration, the pin 146 is received in the axially extending guide portion 108C (see FIG. 9) at the second axial end 108B of the pin guide slot 108.

FIGS. 13-16 illustrate relative movement of HOR 36 components as the HOR 36 transitions from an unlocked configuration to a locked and loaded configuration.

Figure 13:
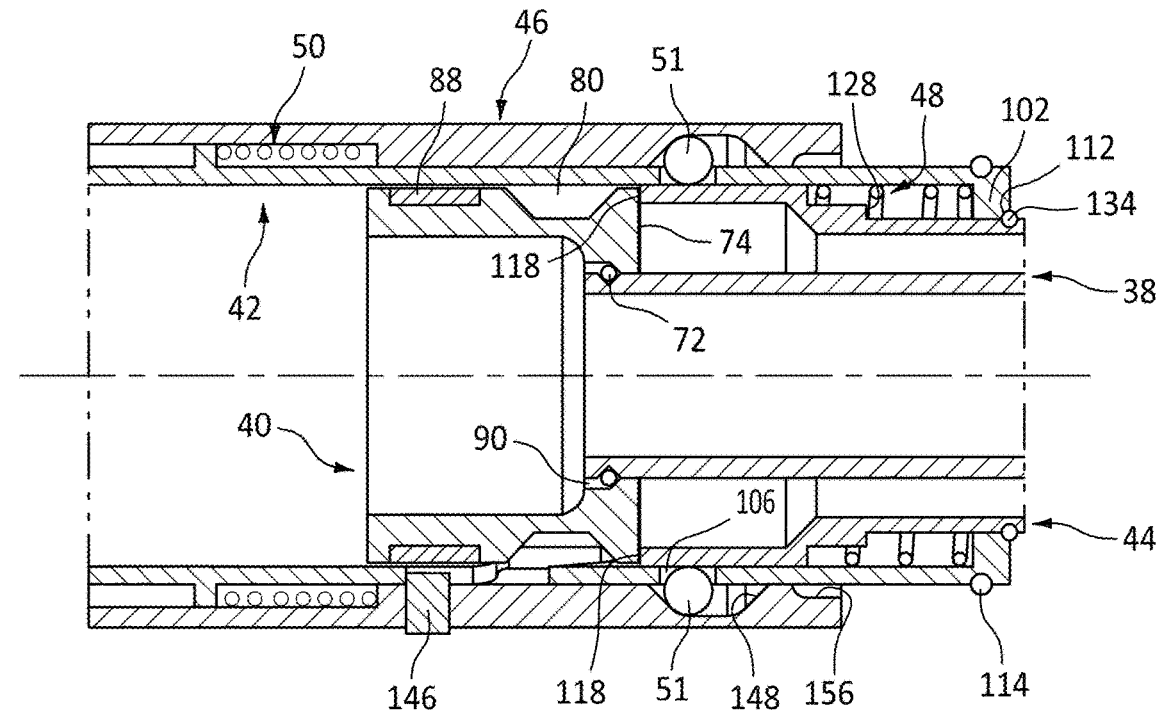
FIG. 13 diagrammatically illustrates the present disclosure HOR embodiment in an unlocked configuration with the piston head translated axially.

Referring to FIGS. 4 and 13, the piston 38 is moved axially in a direction from the second axial end 56 of the HOR 36 toward the first axial end 54 in the process of transitioning from the unlocked configuration to a locked and loaded configuration. The fan cowl member 28A (see FIGS. 3-3B) is attached to the cowl end of the HOR 36 and as the fan cowl member 28A is rotated outwardly, the piston 38 is drawn in the direction from the second axial end 56 of the HOR 36 toward the first axial end 54; i.e., the HOR 36 is expanding. As can be seen in FIG. 13, the PH retainer 72 engages with the PH retainer bore 90 disposed in the piston head 40. As a result, the piston head 40 moves axially with the piston 38. FIG. 13 shows the first axial end 74 of the piston head 40 engaged with the second axial end 118 of the lock sleeve 44 but the lock sleeve 44 has not yet moved axially. The second lock sleeve shoulder surface 128 is spaced apart from the OC first axial end wall 102, the lock spring 48 is not compressed, and the release spring 50 is compressed. Also in this position, the lock balls 51 are partially disposed in the CS channel 148 and partially disposed in the lock ball apertures 106 of the outer cylinder 42, thereby preventing axial movement of the control sleeve 46.

Figure 14:
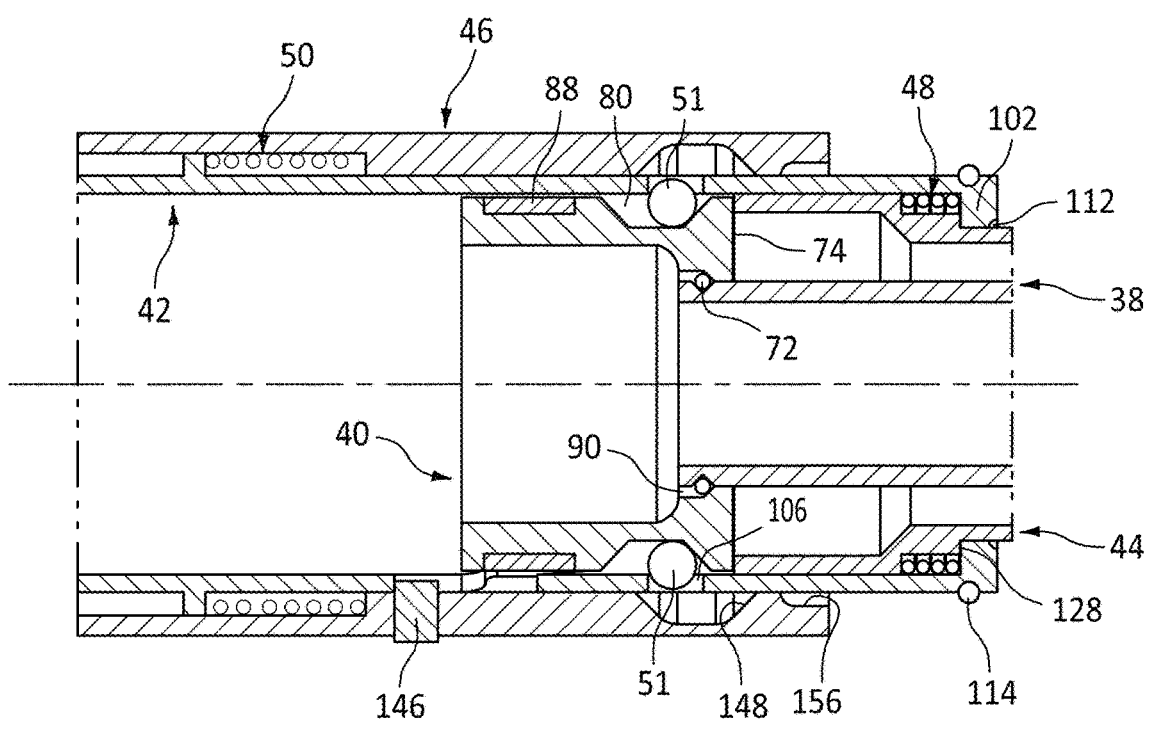
FIG. 14 diagrammatically illustrates the present disclosure HOR embodiment transitioning from an unlocked configuration to a locked configuration.
Figure 15:
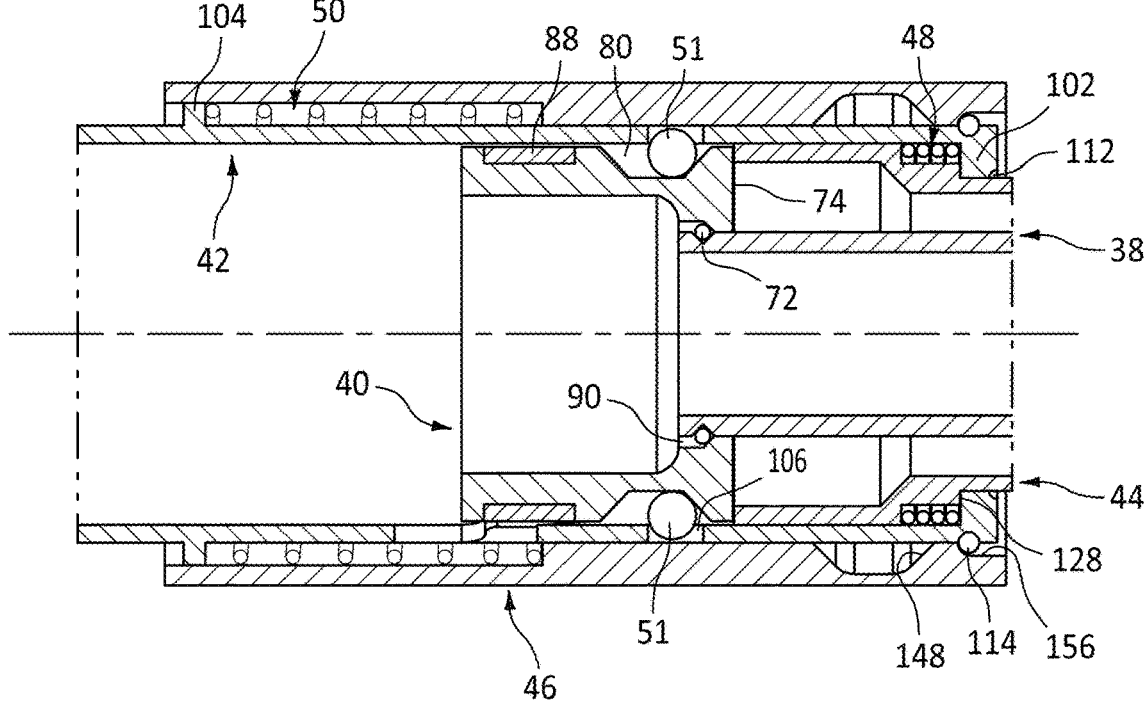
FIG. 15 diagrammatically illustrates the present disclosure HOR embodiment in a locked configuration.

Referring to FIGS. 4 and 14, the piston 38 is moved axially further in the direction from the second axial end 56 of the HOR 36 toward the first axial end 54 in the transition process. In this position, the lock sleeve 44 has moved axially until the second LS shoulder surface 128 is engaged with the OC first axial end wall 102, the lock spring 48 is now compressed, but the release spring 50 remains compressed because the control sleeve 46 has not yet moved axially. The PH first channel 80 is now aligned with the lock ball apertures 106 of the outer cylinder 42. In this aligned position, the control sleeve 46 tends to move axially towards the first axial end 54 under the spring force from spring 50. As a result of the radial force from the ramp 148D of the CS channel 148, the lock balls 51 are pushed radially inward so as to be partially disposed in the lock ball apertures 106 of the outer cylinder 42 and partially disposed in the PH first channel 80. Once the lock balls 51 have left the CS channel 148 and are therefore no longer engaged with the control sleeve 46, the control sleeve 46 is free to move axially toward the first axial end 54 of the HOR 36.

To get to the axial position shown in FIG. 15, the pin 146 extending inwardly from the OC inner radial surface 94 and engaged with the pin guide slot 108 of the outer cylinder 42 travels axially through the axially extending guide portion 108C of the pin guide slot 108 (see FIG. 9) from the second axial end 108B to an intermediate position 108E proximate the interface between the axially extending guide portion 108C and the guide ramp surface 108F of the ramp portion 108D. Once the pin 146 engages the ramp portion 108D, further axial travel of the pin 146 along the guide ramp surface 108F will cause the control sleeve 46 to rotate relative to the outer cylinder 42 (e.g., in an amount approximately equal to the circumferential travel distance "C1") as it travels axially. The control sleeve 46 continues to travel axially and rotationally until the pin 146 arrives at the first axial end 108A of the pin guide slot 108—labeled as the "locked" position. When the control sleeve 46 has traveled sufficiently for the pin 146 to be disposed in the "locked" position, the CS channel 148 is no longer aligned with the lock ball apertures 106 within the outer cylinder 42, and the lock balls 51 are captured by the lock ball apertures 106 of the outer cylinder 42 and the PH first channel 80. In this position, the piston head 40 is "locked" to the outer cylinder 42. The HOR piston 38 position shown in FIG. 15 may be referred to as the "locked" position which reflects the maximum rotational travel of the fan cowl member 28A attached to the HOR 36; e.g., see FIG. 3B. In the HOR 36 locked position, the OC retainer 114 is engaged with the OC retainer bore 156 disposed in the control sleeve 46 to limit the travel of the control sleeve 46 relative to the outer cylinder 42.

Figure 16:
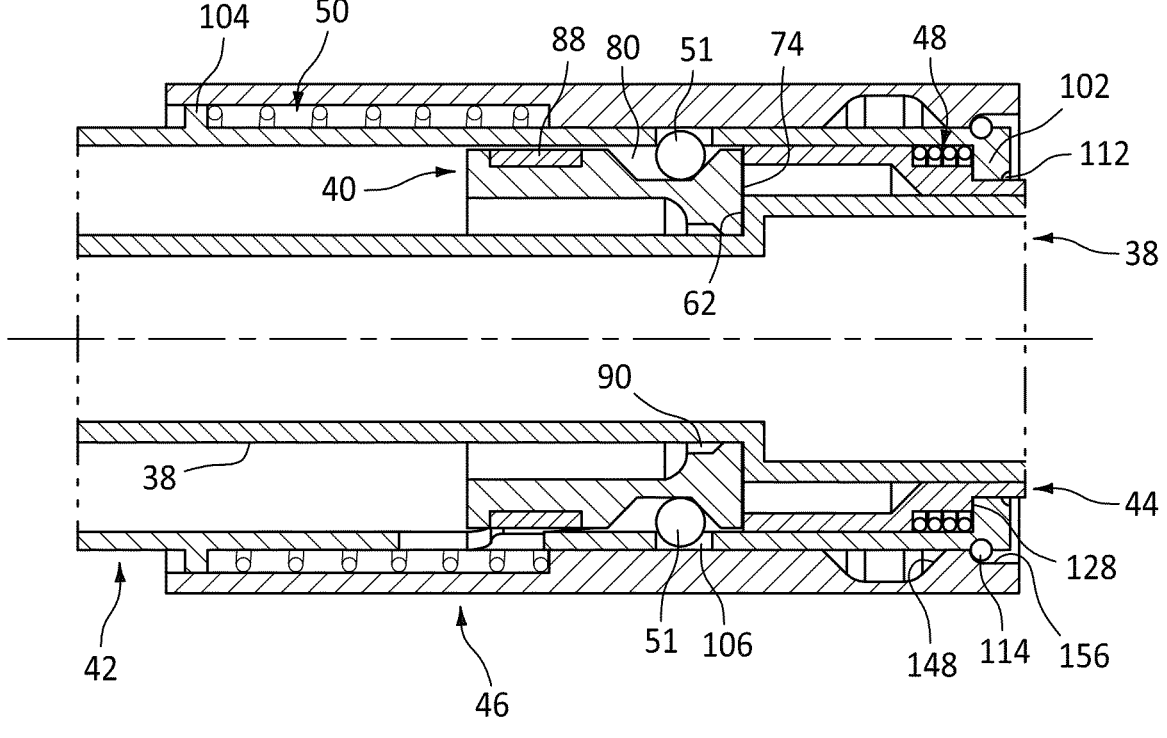
FIG. 16 diagrammatically illustrates the present disclosure HOR embodiment in a locked and loaded configuration.

FIG. 16 diagrammatically illustrates the HOR 36 in a "locked and loaded" configuration. To get to the locked and loaded configuration, the fan cowl member 28A is allowed to rotate some small amount back towards its stowed condition. This reverse movement causes the piston 38 to reverse the earlier described axial movement toward the first axial end 54 of the HOR 36 and now moves toward the second axial end 56 of the HOR 36; i.e., HOR 36 contracting. As stated above, the piston head 40 is now locked to the outer cylinder 42. The piston 38 is permitted to travel axially relative to the piston head 40; i.e., the PH retainer 72 (e.g., see FIG. 12) disengages with the PH retainer bore 90 of the piston head 40 and travels away therefrom. Within a relatively small amount of axial travel, the piston shoulder surface 62 engages with the PH first axial end 74 and further axial travel of the piston 38 is prevented. Hence, the "load"

of the fan cowl member is now borne by the HOR 36. In this locked and loaded configuration, the pin 146 remains in the same position (i.e., position 108A as shown in FIG. 9) even when loaded because no load is passed to the control sleeve 46 and the pin 146 is connected to the control sleeve 46 which stays in same position.

To return the fan cowl member 28A to a stowed configuration and the HOR 36 to an unlocked configuration, the fan cowl member 28A is rotated back towards its maximum stowed condition (e.g., see FIG. 3B) and the HOR 36 expanded. In this manner, the HOR 36 becomes "unloaded". To transition the HOR 36 to the unlocked configuration, the control sleeve 46 must be rotated so that the pin 146 is proximate to the guide ramp surface 108F of the ramp portion 108D of the pin guide slot 108. Failure to rotate the control sleeve 46 will result in the pin 146 contacting the base surface 108H of the ramp portion 108D and the base surface 108H will prevent any further axial travel of the pin 146/HOR piston 38. Hence, the present disclosure HOR 36 requires two actions (i.e., rotation and axial movement of the control sleeve 46) to transition the HOR 36 to the unlocked configuration. The axial movement of the control sleeve 46 causes the release spring 50 to compress. Once the control sleeve 46 is rotated and positioned such that the CS channel 148 is once again aligned with the lock ball apertures 106 in the outer cylinder 42 and the piston 38 has traveled axially an amount to cause the piston shoulder surface 62 to contact the first axial end 74 of the piston head 40, the piston head 40 will begin to travel axially toward the second axial end 56 of the HOR 36. As the piston head 40 moves axially, a ramp surface 80D of the PH first channel 80 (see FIG. 6) will push the lock balls 51 radially outwardly so they are eventually no longer disposed in the PH first channel 80, but rather are disposed in both the lock ball apertures 106 and the CS channel 148. At this point, the piston head 40 is free to travel axially toward the second axial end 56 of the HOR 36. Also at this point, the lock balls 51 engaged with the lock ball apertures 106 and the CS channel 148 lock the control sleeve 46 into its unlocked configuration. At the same time, the lock spring 48 acting on the lock sleeve 44 causes the lock sleeve 44 to travel axially toward the second axial end of the HOR 36 until the LS retainer 134 engages with the LS retainer bore 112 disposed in the OC first axial end wall 102; i.e., the unlocked position of the lock sleeve 44.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A telescopic hold open rod having an axial centerline that extends between a first axial end and a second axial end, comprising:

a control sleeve (CS) having a first CS cavity section defined by a first CS inner radial surface, a second CS cavity section defined by a second CS inner radial surface, a CS channel disposed in the second CS inner radial surface, and a pin extending radially inward from the second CS inner radial surface;

an outer cylinder (OC) having an OC inner cavity, an OC inner radial surface, an OC outer radial surface, an OC axial end wall, a plurality lock ball apertures extending between the OC inner radial surface and the OC outer radial surface, and a pin guide slot configured to receive the pin, wherein the outer cylinder extends axially within the first CS cavity section and the second CS cavity section;

a plurality of lock balls, each configured to pass through a respective lock ball aperture;

a lock sleeve (LS) having an LS bore, wherein a portion of the lock sleeve is disposed in the OC inner cavity;

a piston having a first section and a second section, and a piston shoulder surface that extends radially between the first section and second section, wherein the first section and the second section extend axially within the OC inner cavity, and the second section extends axially within the LS bore;

a piston head (PH) having a PH outer radial surface, a first PH channel disposed in the PH outer radial surface, and a piston bore, wherein the first PH channel extends around a circumference of the PH outer radial surface, the piston bore is configured to receive the first section of the piston, and the piston head is disposed within OC inner cavity;

a release spring disposed between the OC outer radial surface and the first CS inner radial surface and configured to bias the control sleeve toward the first axial end; and a lock spring disposed between the OC outer radial surface and the lock spring and configured to bias the lock sleeve toward the second axial end.

2. The hold open rod of claim 1, wherein the hold open rod is configurable in an unlocked configuration and a locked configuration;

wherein in the unlocked configuration, each respective lock ball extends within a respective said lock ball aperture and the CS channel and the control sleeve is locked in position relative to the outer cylinder.

3. The hold open rod of claim 2, wherein the CS channel extends around a circumference of the second CS cavity section and includes a base surface disposed between a pair of ramp surfaces.

4. The hold open rod of claim 3, wherein in a transition from the unlocked configuration to the locked configuration, the control sleeve is configured to translate axially relative to the outer cylinder in a direction toward the first axial end and one of the ramp surfaces pushes each respective lock ball radially inward.

5. The hold open rod of claim 2, wherein in the locked configuration, each respective lock ball extends within a respective said lock ball aperture and the first PH channel and the piston head is locked in position relative to the control sleeve.

6. The hold open rod of claim 5, wherein the first PH channel extends around a circumference of the piston head and includes a base surface disposed between a pair of ramp surfaces.

7. The hold open rod of claim 6, wherein in a transition from the locked configuration to the unlocked configuration, the piston head is configured to translate axially relative to the outer cylinder in a direction toward the second axial end and one of the ramp surfaces pushes each respective lock ball radially outward.

8. The hold open rod of claim 7, wherein the piston head further includes a bearing disposed in a second PH channel disposed in the PH outer radial surface.

9. The hold open rod of claim 7, wherein the pin guide slot is configured such that a transition from the locked configuration to the unlocked configuration requires the control sleeve to be translated both axially and rotationally relative to the outer cylinder.

10. The hold open rod of claim 9, wherein the pin guide slot has a first axial end, a second axial end, an axially extending guide portion, and a ramp portion;

wherein the ramp portion extends from the first axial end to the axially extending guide portion and the axially extending guide portion extends from the second axial to the ramp portion; and wherein the ramp portion is defined by a guide ramp surface, a side surface, and a base surface that collectively form a generally triangular aperture in the outer cylinder.

11. The hold open rod of claim 1, wherein the piston further includes a piston head retainer that is configured to engage with the piston head in a manner that causes the piston to axially move the piston head in a first direction toward the first axial end, and to disengage with the piston head when the piston is axially moved in a second direction opposite the first direction.

12. The hold open rod of claim 1, wherein the lock sleeve has a first LS shoulder surface that extends radially between a first LS outer radial surface and a second LS outer radial surface, and a second LS shoulder surface that extends radially between the second LS outer radial surface and a third LS outer radial surface, and wherein the first LS outer radial surface and the second LS outer radial surface are disposed in the OC inner cavity.

13. The hold open rod of claim 12, wherein the lock spring is axially disposed between the OC axial end wall and the first LS shoulder surface.

14. The hold open rod of claim 13, wherein the hold open rod is configurable in an unlocked configuration and a locked configuration; and wherein in the locked configuration, the second LS shoulder surface is disposed contiguous with the OC axial end wall.

15. The hold open rod of claim 14, wherein the lock sleeve further includes a lock sleeve retainer that is configured to engage with the OC axial end wall when the hold open rod is disposed in the unlocked configuration, and the lock sleeve retainer is disengaged with the OC axial end wall when the hold open rod is disposed in the locked configuration.

16. The hold open rod of claim 1, wherein the hold open rod is configurable in a locked and loaded configuration, and in the locked and loaded configuration, the piston shoulder surface is disposed in contact with a first axial end of the piston head.

17. The hold open rod of claim 1, wherein the outer cylinder includes a release spring flange extending radially outward from the OC outer radial surface; and wherein the control sleeve further includes a CS shoulder surface extending between the first CS inner radial surface and the second CS inner radial surface; and wherein the release spring is axially disposed between the release spring flange and the CS shoulder surface.

18. The hold open rod of claim 1, wherein the hold open rod is configurable in an unlocked configuration and a locked configuration; and wherein the outer cylinder further includes an OC retainer engaged with the OC outer radial surface and the control sleeve includes an OC retainer bore disposed at a first axial end of the control sleeve;

wherein in the locked configuration, the OC retainer is engaged with the OC retainer bore, and in the unlocked configuration the OC retainer is disengaged with the OC retainer bore.

19. The hold open rod of claim 1, wherein the hold open rod is configurable in an unlocked configuration and a locked configuration; and wherein in the unlocked configuration, each respective lock ball extends within a respective said lock ball aperture and the CS channel and the control sleeve is locked in position relative to the outer cylinder; and wherein in the locked configuration, each respective lock ball extends within a respective said lock ball aperture and the first PH channel and the piston head is locked in position relative to the outer cylinder.

20. The hold open rod of claim 19, wherein in a first transition from the unlocked configuration to the locked configuration, the piston head is configured to translate axially relative to the outer cylinder until the first PH channel is aligned with the lock ball apertures, and the control sleeve is configured to translate axially and rotationally relative to the outer cylinder, and each respective lock ball is moved radially inward to extend within the respective said lock ball aperture and the first PH channel; and wherein in a second transition from the locked configuration to the unlocked configuration, the control sleeve is configured to translate rotationally and axially relative to the outer cylinder, the axial translation in a direction toward the second axial end, until the CS channel is aligned with the lock ball apertures, and the piston head is configured to translate axially relative to the outer cylinder in a direction toward the second axial end, and each respective lock ball is moved radially outward to extend within the respective said lock ball aperture and the CS channel.

* * * * *